US006333392B1

(12) United States Patent
Asao et al.

(10) Patent No.: US 6,333,392 B1
(45) Date of Patent: Dec. 25, 2001

(54) THERMOSETTING AMIC ACID MICROFINE PARTICLES, THERMOSETTING IMIDE MICROFINE PARTICLES, CROSSLINKED IMIDE MICROFINE PARTICLES, AND PROCESSES FOR THEIR PRODUCTION

(75) Inventors: Katsuya Asao, Osaka; Hidenori Saito, Yokohama, both of (JP)

(73) Assignees: Sumitomo Bakelite and Co. Ltd., Tokyo; Osaka Prefectual Government, Osaka-fu, both of (JP)

( * ) Notice: Subject to any disclaimer, the term of this patent is extended or adjusted under 35 U.S.C. 154(b) by 0 days.

(21) Appl. No.: 09/565,483

(22) Filed: May 5, 2000

(51) Int. Cl.$^7$ .............................. C08G 73/10; C08G 69/28
(52) U.S. Cl. ..................... 528/170; 528/125; 528/126; 528/128; 528/172; 528/173; 528/179; 528/183; 528/188; 528/220; 528/229
(58) Field of Search ..................................... 528/170, 310, 528/332, 352, 125, 126, 128, 172, 173, 183, 188, 220, 229, 350

(56) References Cited

U.S. PATENT DOCUMENTS

| | | | |
|---|---|---|---|
| 3,607,838 | * 9/1971 | Strickrodt | 528/351 |
| 4,098,800 | 7/1978 | Byrne | 260/346.3 |
| 5,145,943 | 9/1992 | Li et al. | 528/353 |
| 5,463,016 | 10/1995 | Tomioka et al. | 524/323 |
| 5,466,732 | 11/1995 | Tomioka et al. | 528/353 |

FOREIGN PATENT DOCUMENTS

| | | |
|---|---|---|
| 1954526 | 6/1971 | (DE) . |
| 0531259A1 | 3/1993 | (EP) . |
| 0982343A2 | 3/2000 | (EP) . |
| 61-45651 | 10/1986 | (JP) . |
| 5-271539 | 10/1993 | (JP) . |
| 9-302089 | 11/1997 | (JP) . |

OTHER PUBLICATIONS

The Chemical Daily dated Mar. 14, 1997 (together with English translation).
English Translation of German Document (DE 19 54 526A), cited in the European Search Report.
Patent Abstracts of Japan, vol. 1997, No. 06, Jun. 30, 1997 & JP 09 054228, Feb. 25, 1997.

* cited by examiner

Primary Examiner—P. Hampton-Hightower
(74) Attorney, Agent, or Firm—Smith, Gambrell & Russell, LLP

(57) ABSTRACT

An object of the invention is to provide thermosetting amic acid microfine particles, thermosetting imide microfine particles and crosslinked imide microfine particles of controlled particle shape and size distribution. The invention provides a production technology which comprises mixing a first solution containing a tetracarboxylic anhydride and a C=C bond-containing acid anhydride with a second solution containing a diamine compound, causing precipitation of thermosetting amic acid microfine particles from the resulting mixture, and further producing thermosetting imide microfine particles and crosslinked imide microfine particles from the thermosetting amic acid microfine particles.

20 Claims, No Drawings

THERMOSETTING AMIC ACID MICROFINE PARTICLES, THERMOSETTING IMIDE MICROFINE PARTICLES, CROSSLINKED IMIDE MICROFINE PARTICLES, AND PROCESSES FOR THEIR PRODUCTION

FIELD OF THE INVENTION

This invention relates to novel thermosetting amic acid microfine particles, thermosetting imide microfine particles, thermoset (crosslinked) imide microfine particles, and processes for their production.

BACKGROUND OF THE INVENTION

Imides inclusive of polyimides have good heat resistance, resistance to chemicals, and electric insulating properties in addition to favorable mechanical characteristics so that they have been used not only as electric/electronic materials and automotive materials but also broadly as substitutes for metals and ceramics.

While polyimides are classified by skeletal chain morphology into linear polyimides (thermoplastic type) and three-dimensional network polyimides (thermosetting type), the latter thermosetting polyimides are particularly superior in heat resistance, processability, moldability, etc. and, therefore, are generally acknowledged to be of great use as electrical laminate materials, aerospace materials, and various other molding materials.

As regards the thermosetting imide resin, many versions are known, such as the resin produced by a process starting with a bismaleimide and a diamine compound, as represented by KERIMID (trademark, manufactured by Rhone-Poulenc), and the terminal double bond-containing resin such as the adduct type imide resin represented by the PMR series resin (PMR-11, trademark, manufactured by NASA).

The thermosetting imide resin has been produced typically by the method which comprises reacting a tetracarboxylic dianhydride and an acid anhydride having a carbon-carbon double bond with an organic diamine compound in an organic solvent generally at a temperature of 0~100° C. to prepare a thermosetting amic acid solution, pouring this solution in a nonsolvent for the thermosetting amic acid, recovering the resulting precipitate, and subjecting it to cyclization for imidation.

However, when thermosetting imide resin microfine powders are to be produced from a thermosetting amic acid solution as in the above method, the resin block recovered following said imidation reaction must be pulverized by mechanical means, which adds to the complexity of the process. Moreover, a procedure by mechanical pulverization yields only coarse particles so that a monodispersed system of fine discrete particles can hardly be obtained. In addition, by the above production technology, the shape and size distribution of particles can hardly be controlled. For these reasons, there has been a persistent demand for the development of a technology for producing microfine particles of a thermosetting imide with good monodispersibility and other favorable characteristics.

An object of the present invention, therefore, is to provide thermosetting amic acid microfine particles, thermosetting imide microfine particles and crosslinked imide microfine particles each well-controlled in shape and size distribution.

SUMMARY OF THE INVENTION

In view of the above problems with the prior art, the inventors of the present invention made intensive investigations. As a result, they found that the above object can be accomplished by a technology involving the specific steps disclosed herein and have accordingly completed the present invention.

The present invention, therefore, is directed to a technology for producing thermosetting amic acid microfine particles, thermosetting imide microfine particles and crosslinked imide microfine particles, which has the characteristics set forth below.

1. A method of producing thermosetting amic acid microfine particles starting with a tetracarboxylic anhydride, a carbon-carbon double bond-containing acid anhydride and a diamine compound to synthesize a thermosetting amidic acid, which comprises
   (a) a first step of preparing a first solution containing said tetracarboxylic anhydride and said carbon-carbon double bond-containing acid anhydride and a second solution containing said diamine compound and
   (b) a second step of mixing said first solution with said second solution and precipitating thermosetting amic acid microfine particles from the mixture (the first invention).

2. A method of producing thermosetting imide microfine particles starting with a tetracarboxylic anhydride, a carbon-carbon double bond-containing acid anhydride and a diamine compound to synthesize a thermosetting imide, which comprises
   (a) a first step of preparing a first solution containing said tetracarboxylic anhydride and said carbon-carbon double bond-containing acid anhydride and a second solution containing said diamine compound,
   (b) a second step of mixing said first solution with said second solution and precipitating thermosetting amic acid microfine particles from the mixture, and
   (c) a third step of imidating the resulting amic acid microfine particles to provide thermosetting imide microfine particles (the second invention).

3. A method of producing crosslinked imide microfine particles starting with a tetracarboxylic anhydride, a carbon-carbon double bond-containing acid anhydride and a diamine compound, which comprises
   (a) a first step of preparing a first solution containing said tetracarboxylic anhydride and carbon-carbon double bond-containing acid anhydride and a second solution containing said diamine compound,
   (b) a second step of mixing said first solution with said second solution and precipitating thermosetting amic acid microfine particles from the mixture,
   (c) a third step of imidating the resulting thermosetting amic acid microfine particles to provide thermosetting imide microfine particles, and
   (d) a fourth step of heat-treating the resulting thermosetting imide microfine particles (the third invention).

The present invention is further directed to the following thermosetting amic acid microfine particles, thermosetting imide microfine particles and crosslinked imide microfine particles.

4. Thermosetting amic acid microfine particles having a mean particle diameter of 0.03~1 $\mu$m with a coefficient of variation within the range of 3~15% as obtained by the above method according to the first invention.

5. Thermosetting imide microfine particles having a mean particle diameter of 0.03~1 $\mu$m with a coefficient of variation within the range of 3~15% as obtained by the above method according to the second invention.

6. Crosslinked imide microfine particles having a mean particle diameter of 0.03~1 μm with a coefficient of variation within the range of 3~15% as obtained by the above method according to the third invention.

DETAILED DESCRIPTION OF THE INVENTION

In the production technology of the present invention, the first step of the second invention and that of the third invention are both identical to the first step of the first invention. The second step of the second invention and that of the third invention are also identical to the second step of the first invention. The third step of the third invention is identical to the third step of the second invention. The respective steps are now described in detail.

(1) The First Step

In preparing thermosetting amic acid microfine particles in accordance with the present invention, a first solution containing a tetracarboxylic anhydride and a carbon-carbon double bond (C=C bond)-containing acid anhydride and a second solution containing a diamine compound are respectively prepared in the first place. In carrying the present invention into practice, it is particularly advisable that the tetracarboxylic anhydride and C=C carbon-containing acid anhydride on one hand and the diamine compound on the other hand are prepared as independent solutions.

The First Solution

The tetracarboxylic anhydride is not particularly restricted but any compound heretofore used in imide (polyimide) synthesis can be employed. Thus, the tetracarboxylic anhydride which can be used includes aromatic tetracarboxylic anhydrides such as 3,3',4,4'-benzophenonetetracarboxylic dianhydride (BTDA), 3,3',4,4'-biphenyltetracarboxylic dianhydride, 2,3,3',4'-biphenyltetracarboxylic dianhydride, pyromellitic dianhydride (PMDA), 1,3-bis(2,3-dicarboxyphenoxy)benzene dianhydride, 1,4-bis(2,3-dicarboxyphenoxy)benzene dianhydride, 2,3,3',4'-benzophenonetetracarboxylic dianhydride, 2,2',3,3'-benzophenonetetracarboxylic dianhydride, 2,2',3,3'-biphenyltetracarboxylic dianhydride, 2,2',6,6'-biphenyltetracarboxylic dianhydride, naphthalene-1,2,4,5- tetracarboxylic dianhydride, anthracene-2,3,6,7-tetracarboxylic dianhydride, phenanthrene-1,8,9,10-tetracarboxylic dianhydride, etc.; aliphatic tetracarboxylic anhydrides such as butane-1,2,3,4-tetracarboxylic dianhydride etc.; alicyclic tetracarboxylic anhydrides such as cyclobutane-1,2,3,4-tetracarboxylic dianhydride etc.; heterocyclic tetracarboxylic anhydrides such as thiophene-2,3,4,5-tetracarboxylic anhydride, pyridine-2,3,5,6-tetracarboxylic anhydride and so on. These anhydrides can be used alone or in a combination of two or more species. In the present invention, BTDA and the like are particularly preferred.

As an alternative, the compound available on partial substitution of a tetracarboxylic anhydride with an acid chloride can be used. Substitution with the acid chloride is rewarded by the benefit that the reaction rate may be increased depending on other conditions, or the product particles may be further reduced in diameter. The acid chloride mentioned above includes diethyl pyromellitate diacyl chlorides, among others.

The carbon-carbon double bond-containing acid anhydride (hereinafter sometimes referred to briefly as "acid anhydride") is not particularly restricted insofar as it contains a carbon-carbon double bond (C=C bond) and, as such, the acid anhydrides hitherto in use in synthesizing thermosetting polyimides can be employed. The carbon-carbon double bond may occur either once or twice or more frequently in the acid anhydride molecule. For example, maleic anhydride, citraconic anhydride, 5-norbornene-2,3-dicarboxylic anhydride, cis-4-cyclohexene-1,2-dicarboxylic anhydride, etc. can be employed. These acid anhydrides can be used alone or in a combination of two or more species. Among these, maleic anhydride and 5-norbornene-2,3-dicarboxylic anhydride are particularly preferred.

The solvent for use in the first solution is not particularly restricted insofar as the tetracarboxylic anhydride and acid anhydride are soluble but the product thermosetting amic acid will not be soluble therein. Thus, 2-propanone, 3-pentanone, tetrahydropyrene, epichlorohydrin, acetone, methyl ethyl ketone (MEK), acetophenone, tetrahydrofuran (THF), dioxane, methyl acetate, ethyl acetate, acetanilide, methanol, ethanol, isopropyl alcohol, toluene and xylene can be mentioned by way of example, and a solvent containing at least one of them can be employed. Furthermore, even a solvent in which the thermosetting amic acid is soluble, for example an aprotic polar solvent, such as N,N-dimethylformamide (DMF), N,N-dimethylacetamide (DMAc) or N-methyl-2-pyrrolidone (NMP), can also be used if blended with a poor solvent of thermosetting amic acid, such as acetone, ethyl acetate, MEK, toluene or xylene, in a ratio providing for precipitation of the thermosetting amic acid.

The concentrations of said tetracarboxylic anhydride and said acid anhydride in the first solution can be judiciously selected according to the species of tetracarboxylic anhydride and acid anhydride to be used and the concentration of the second solution, among other factors. The concentration of the tetracarboxylic anhydride is usually about 0.0001~0.1 mol/L, preferably 0.0001~0.01 mol/L. The concentration of said acid anhydride is usually about 0.00001~0.1 mol/L, preferably 0.0001~0.01 mol/L. The proportions of these two kinds of anhydrides can be judiciously selected so as to yield the ratio to be defined hereinafter.

The Second Solution

The diamine compound is not particularly restricted, either, but the diamines heretofore in use for the synthesis of imides (polyimides) can be invariably employed. For example, aromatic diamines such as 4,4'-diaminodiphenylmethane (DDM), 4,4'-diaminodiphenyl ether (DPE), 4,4'-bis(4-aminophenoxy)biphenyl(BAPB), 1,4'-bis(4-aminophenoxy)benzene (TPE-Q), 1,3'-bis(4-aminophenoxy)benzene (TPE-R), o-phenylenediamine, m-phenylenediamine, p-phenylenediamine, 3,4'-diaminodiphenyl ether, 4,4'-diaminodiphenyl sulfone, 3,4'-diaminodiphenyl sulfone, 3,3'-diaminodiphenyl sulfone, 4,4'-methylene-bis(2-chloroaniline), 3,3'-dimethyl-4,4'-diaminobiphenyl, 4,4'-diaminodiphenyl sulfide, 2,6-diaminotoluene, 2,4-diaminochlorobenzene, 1,2-diaminoanthraquinone, 1,4'-diaminoanthraquinone, 3,3'-diaminobenzophenone, 3,4'-diaminobenzophenone, 4,4'-diaminobenzophenone, 4,4'-diaminobibenzyl, R(+)-2,2'-diamino-1,1'-binaphthalene, S(+)-2,2'-diamino-1,1'-binaphthalene, etc.; aliphatic diamines such as 1,2-diaminomethane, 1,4-diaminobutane, tetramethylenediamine, 1,10-diaminododecane, etc.; and alicyclic diamines such as 1,4-diaminocyclohexane, 1,2-diaminocyclohexane, bis(4-aminocyclohexyl)methane, 4,4'-diaminodicyclohexylmethane, etc.; and other compounds such as 3,4-diaminopyridine, 1,4-diamino-2-butanone, etc. can be employed. These diamine compounds can be used alone or in a combination of two or more species. In the present invention, DPE or TPE-R, for instance, is preferred.

Furthermore, in the present invention, other amine compounds (monoamine compounds and polyamine compounds) can be used in addition to said diamine compound. By using them, the characteristics of the thermosetting amic acid, thermosetting imide and crosslinked imide can be modified.

The solvent for use in the second solution is not particularly restricted provided that it is a solvent in which the diamine compound is soluble but the product thermosetting amic acid is insoluble. Thus, 2-propanone, 3-pentanone, tetrahydropyrene, epichlorohydrin, acetone, methyl ethyl ketone (MEK), acetophenone, tetrahydrofuran (THF), dioxane, methyl acetate, ethyl acetate, acetanilide, methanol, ethanol, isopropyl alcohol, etc. can be mentioned by way of example, and a solvent containing at least one of them can be employed. Furthermore, even a solvent in which the thermosetting amic acid is soluble, for example an aprotic polar solvent, such as DMF, DMAc or NMP, can also be used if it is blended with a poor solvent of thermosetting amic acid, such as acetone, ethyl acetate, MEK, toluene or xylene, in a ratio providing for precipitation of the thermosetting amic acid.

The concentration of the diamine compound in the second solution can be judiciously selected according to the species of diamine compound used, the concentration of the first solution, etc. but is generally about 0.000015~0.15 mol/L, preferably 0.00015~0.015 mol/L.

(2) The Second Step

In the second step, the first solution is mixed with the second solution and thermosetting amic acid microfine particles are precipitated from the mixture. The blending ratio of the first solution to the second solution can be judiciously adjusted according to the concentrations of the respective solutions, among other factors, but the usual ratio in terms of diamine compound:tetracarboxylic anhydride:acid anhydride (molar ratio) is approximately 1:0.002~0.998:0.001~3.999, preferably 1:0.05~0.95:0.1~3.9, and more preferably 1:0.25~0.75:0.5~3.5.

In executing the second step, it is particularly advisable to cause precipitation of the thermosetting amic acid under stirring. This stirring can be effected by means of a known stirrer.

In the present invention, however, ultrasonic agitation is the preferred method of stirring. Ultrasonic agitation enables a reduction of about 50% in mean particle diameter compared with other stirring methods. For this ultrasonic agitation, any known ultrasonic device (for example, a ultrasonic cleaner) and operate conditions thereof can be used. The frequency of ultrasonic waves for use may be judiciously selected according to the desired particle diameter and other factors but may usually be about 28~100 kHz, preferably 28~45 kHz.

The temperature at which the second step is carried out is not particularly restricted but may usually be about 0~130° C., preferably 20~40° C. The stirring is continued until the precipitation of thermosetting amic acid microfine particles has substantially gone to completion. The stirring time is about 30 seconds to about 30 minutes but this range is not critical.

The thermosetting amic acid microfine particles precipitated in the second step can be recovered by a known solid-liquid separation procedure, such as centrifugation. As an alternative, the reaction mixture can be directly subjected to the third step without isolating the thermosetting amic acid microfine particles.

The thermosetting amic acid microfine particles obtained in the second step, when they occur as spherical particles, are generally in a monodispersed system having a mean particle diameter of 0.03~1 $\mu$m with a coefficient of variation within the range of 3~15%. When the particles obtained are formless, the dimension per aspect thereof (mean) is usually about 0.5~1 $\mu$m. The above-mentioned amic acid microfine particles may be oligomer or polymer particles. In other words, the thermosetting amic acid microfine particles according to the present invention include thermosetting polyamic acid microfine particles as well.

The mean particle diameter of the particles was determined using a scanning electron microscope(SEM). Thus, 100 particles were randomly selected on the SEM photograph and the mean diameter of those particles was calcurated by using the following equation (a). Based on the mean diameter value, the standerd deviation "S" was calcurated by using the following equations (b) and (c). The coefficient of variation "C" was calcurated by using the equation (d)

$$X=(1/n)\Sigma Xi \qquad (a)$$

(n:number of measured data, Xi:measured value)

$$S^2=[1/1-n](\Sigma Xi^2-X\cdot\Sigma Xi) \qquad (b)$$

$$S=(S^2)^{1/2} \qquad (c)$$

$$C=(S/X)\times100(\%) \qquad (d)$$

(3) The Third Step

In the step, the thermosetting amic acid microfine particles obtained in the second step are imidated to provide thermosetting imide microfine particles. The imidation method is not particularly restricted insofar as thermosetting imide microfine particles can be directly formed from the thermosetting amic acid microfine particles. Preferred for the practice of the present invention, however, is (i) the process (thermal cyclization) which comprises heating the starting particles in an organic solvent or (ii) the process (chemical cyclization) in which a chemical imidation reaction is carried out in an organic solvent.

The thermal cyclization (i) mentioned above can be typically carried out by dispersing thermosetting amic acid microfine particles in a organic solvent and heating the dispersion generally at a temperature of not below 100° C. (preferably 100~140° C.). The organic solvent should be a poor solvent of thermosetting amic acid which has a boiling point over the temperature necessary for imidation but is not otherwise restricted. Particularly in the present invention, the organic solvent containing a solvent capable of forming an azeotropic mixture with water (hereinafter referred to as "azeotropic solvent") is preferably used. Thus, in the present invention, such an azeotropic solvent is preferably used as part of said organic solvent or as the sole solvent. The azeotropic solvent which can be used includes but is not limited to xylene, ethylbenzene, octane, cyclohexane, diphenyl ether, nonane, pyridine and dodecane. These solvents can be used alone or in a combination of two or more species. Preferably, in the presence invention, the azeotropic solvent should account for at least 10 volume % of the organic solvent. Since the use of an azeotropic solvent permits removal of byproduct water (chiefly the water of condensation) from the reaction system by azeotropic distillation at the reflux temperature, the hydrolysis of the unreacted amide bond can be prevented to inhibit change in particle shape and molecular weight, with the result that thermosetting imide microfine particles with improved monodispersibility can be provided with greater certainty.

The proportion of thermosetting amic acid microfine particles to be dispersed in the organic solvent can be judiciously selected according to the kind of organic solvent and other factors but may generally be about 1~50 g/L, preferably 5~10 g/L.

In the present invention, it is preferable to use a catalyst (condensation catalyst) such as an acid catalyst, e.g. p-toluenesulfonic acid, a cobalt catalyst, e.g. cobalt acetate, cobalt naphthenate or the like, a nickel catalyst, e.g. nickel acetate or the like, an alkaline earth metal compound, e.g. magnesium acetate, calcium acetate or the like, or an alkali metal compound, e.g. lithium acetate. Since the thermosetting amic acid contains a polymerizable double bond, the imidation reaction is preferably carried through at a low temperature in a short period of time. The polymerization reaction can be suppressed by using a condensation catalyst which promotes the imidation.

In the imidation method (ii) involving a chemical reaction, the well-known chemical cyclization process can be applied. A typical process comprises dispersing thermosetting amic acid microfine particles in an organic solvent containing acetic anhydride or the like as a dehydrating agent and heating the dispersion with stirring at a temperature of usually about 15~115° C. for about 24 hours. In this reaction, it is preferable to use a dehydration catalyst such as pyridine, β-picoline or the like. The proportion of the solvent can be judiciously selected. The preferred level of addition of the dehydrating agent is at least equivalent to the water of condensation formed in the imidation reaction.

The thermosetting imide microfine particles formed in the third step can be recovered by a known procedure and, where necessary, washed with an organic solvent such as petroleum ether, methanol or acetone. As an alternative, the reaction mixture may be subjected to the treatment of the forth step without recovering the thermosetting imide microfine particles. (4) The fourth step In the fourth step of the third invention, the thermosetting imide microfine particles obtained in the third step are heat-treated to provide crosslinked imide microfine particles.

The method for heat treatment is not particularly restricted insofar as the crosslinking reaction can be induced. A typical method comprises dispersing thermosetting imide microfine particles in an organic solvent and heating the dispersion at a temperature of about 25~250° C. for about 1~24 hours. The organic solvent for use is not particularly restricted but includes NMP and DMAc, among others. As far as the crosslinking reaction can be allowed to proceed, this step can be executed in the absence of a solvent. The proportion of thermosetting imide microfine particles to be dispersed in the organic solvent is not particularly restricted provided that the imide can be crosslinked.

The crosslinking reaction proceeds by the Michael addition reaction between the carbon-carbon double bond and the amine and the polymerization reaction of the C=C bond. The ratio of said Michael addition reaction to said polymerization reaction is dependent on the ratio of the acid anhydride functionality of said tetracarboxylic anhydride and acid anhydride to the amino functionality of the diamine used. Thus, the ratio of amino functionality to acid anhydride functionality is increased, the proportion of the Michael addition reaction is increased, while the ratio of amino functionality to acid anhydride functionality is decreased, the polymerization reaction involving carbon-carbon double bonds predominate in the crosslinking.

The crosslinked imide microfine particles formed in the fourth step can be recovered by a known procedure and, where necessary, washed with an organic solvent such as petroleum ether, methanol, acetone or the like.

The thermosetting imide microfine particles and crosslinked imide microfine particles obtained in the fourth step, when they occur as spherical particles, are generally in a monodispersed system having a mean particle diameter of 0.03~1 μm with a coefficient of variation within the range of 3~15%. When the particles obtained are formless, the dimension per aspect thereof (mean) is usually about 0.1~1 μm.

The shape of the thermosetting imide microfine particles and crosslinked imide microfine particles is generally derived from and reflects the shape of the starting thermosetting amic acid microfine particles and may for example be spheral or formless. Moreover, said imide microfine particles and crosslinked imide particles may be oligomer or polymer particles. Thus, the thermosetting imide microfine particles and crosslinked imide microfine particles include thermosetting polyimide microfine particles and crosslinked polyimide microfine particles.

In accordance with the production technology of the present invention, monodispersed systems of fine thermosetting amic acid, thermosetting imide and crosslinked imide microfine particles each with a mean particle diameter of not more than 1 μm (usually not more than 0.7 μm) and a narrow particle size distribution can be provided with ease. Particularly depending on conditions, even microfine particles with a mean particle diameter of as small as 0.1 μm or less can be provided.

Furthermore, in the production technology of the invention, the particle diameter, shape and size distribution can be controlled by adjusting the production conditions appropriately.

Particularly since the thermosetting imide microfine particles and crosslinked imide microfine particles of the present invention retain the inherent characteristics of thermosetting imide resin, such as good heat resistance and electric insulating properties, they can be used not only in the conventional uses for thermosetting imide resins but also broadly as coating agents and molding fillers for electrically insulated parts, electric/electronic materials such as liquid crystal spacers, adhesives such as heat-resisting adhesives, etc. and even in the field of composite materials.

BEST MODE FOR CARRYING OUT THE INVENTION

The following working and comparative examples are intended to further clarify the advantages of the present invention.

The glass transition temperatures indicated were found by measuring the inflection point by differential scanning calorimetry (DSC). As to measuring conditions, the rate of temperature increase was 20° C./min. and the flow rate of nitrogen was 50 ml/min. None of the microfine particles according to the working examples and comparative examples showed melting points (Tm).

For ultrasonic agitation in the working examples, Ultrasonic Cleaner CA-2481 II (Kaijo Denki K.K.) was used.

EXAMPLE 1

To begin with, a first solution was prepared by dissolving 0.001 mol of BTDA and 0.001 mol of maleic anhydride in 50 ml of acetone [BTDA/maleic anhydride/acetone=0.001 mol/0.001 mol/50 ml solution; the like expression is used hereinafter]. As a second solution, DPE/acetone=0.002 mol/50 ml was prepared.

Then, the two solutions were blended and subjected to ultrasonic agitation at a frequency of 38 kHz at 25° C. for 10 minutes, whereby thermosetting amic acid microfine particles were precipitated. The thermosetting amic acid microfine particles thus obtained were examined by SEM and with 100 particles randomly selected on the SEM photograph, the mean particle diameter and the coefficient of variation were calculated by the method described in the text. The mean particle diameter of the above thermosetting amic microfine particles was 0.56 μm with the coefficient of variation of 8.3%.

One gram of the recovered thermosetting amic acid microfine particles were dispersed in a mixed solvent composed of xylene (180 ml) and NMP (20 ml) containing 1 g of p-toluenesulfonic acid and the dispersion was refluxed for imidation at 120° C. for about 4 hours. The resulting thermosetting imide microfine particles were examined by SEM and the mean particle diameter and coefficient of variation were determined in the same manner as above. As a result, the mean particle diameter was found to be 0.52 μm and the coefficient of variation to be 6.7%.

A one-gram portion of the above thermosetting imide microfine particles was heated for crosslinking reaction in an oven at 250° C. for about 1 hour. The resulting crosslinked imide microfine particles were examined by SEM. The mean particle diameter and coefficient of variation were 0.51 μm and 6.5%, respectively. The glass transition temperature (Tg) and thermal decomposition temperature [Td (5 wt. % loss)] of the above crosslinked imide microfine particles were 285° C. and 537° C., respectively.

EXAMPLE 2

Except that BTDA/maleic anhydride/acetone=0.002 mol/ 0.001 mol/50 ml was used as the first solution and DPE/ acetone=0.002 mol/50 ml as the second solution, the series of procedures described in Example 1 were repeated to provide thermosetting amic acid microfine particles, thermosetting imide microfine particles and crosslinked imide microfine particles. The mean partcle diameters (Mean diameter) of those particles and the coefficients of variation were also determined as in Example 1. The results are shown in Tables 1~3.

EXAMPLE 3

Except that BTDA/maleic anhydride/acetone=0.0005 mol/0.0015 mol/50 ml was used as the first solution and DPE/acetone=0.002 mol/50 ml as the second solution, the series of procedures described in Example 1 were repeated to provide thermosetting amic acid microfine particles, thermosetting imide microfine particles and crosslinked imide microfine particles. The mean particle diameters of those particles and the coefficients of variation were also determined as in Example 1. The results are shown in Tables 1~3.

EXAMPLE 4

Except that BTDA/maleic anhydride/acetone=0.001 mol/ 0.0015 mol/50 ml was used as the first solution and DPE/ acetone=0.002 mol/50 ml as the second solution, the series of procedures described in Example 1 were repeated to provide thermosetting amic acid microfine particles, thermosetting imide microfine particles and crosslinked imide microfine particles. The mean particle diameters of those particles and the coefficients of variation were also determined as in Example 1. The results are shown in Tables 1~3.

EXAMPLE 5

Except that BTDA/maleic anhydride/acetone=0.0002 mol/0.0018 mol/50 ml was used as the first solution and DPE/acetone=0.002 mol/50 ml as the second solution, the series of procedures described in Example 1 were repeated to provide thermosetting amic acid microfine particles, thermosetting imide microfine particles and crosslinked imide microfine particles. The mean particle diameters of those particles and the coefficients of variation were also determined as in Example 1. The results are shown in Tables 1~3.

EXAMPLE 6

Except that BTDA/maleic anhydride/acetone=0.0004 mol/0.0018 mol/50 ml was used as the first solution and DPE/acetone=0.002 mol/50 ml as the second solution, the series of procedures described in Example 1 were repeated to provide thermosetting amic acid microfine particles, thermosetting imide microfine particles and crosslinked imide microfine particles. The mean particle diameters of those particles and the coefficients of variation were also determined as in Example 1. The results are shown in Tables 1~3.

EXAMPLE 7

Except that BTDA/maleic anhydride/acetone=0.002 mol/ 0.001 mol/50 ml was used as the first solution and DDM/ acetone=0.002 mol/50 ml as the second solution, the series of procedures described in Example 1 were repeated to provide thermosetting amic acid microfine particles, thermosetting imide microfine particles and crosslinked imide microfine particles. The mean particle diameters of those particles and the coefficients of variation were also determined as in Example 1. The results are shown in Tables 1~3.

EXAMPLE 8

Except that PMDA/maleic anhydride/acetone=0.002 mol/ 0.001 mol/50 ml was used as the first solution and DPE/ acetone=0.002 mol/50 ml as the second solution, the series of procedures described in Example 1 were repeated to provide thermosetting amic acid microfine particles, thermosetting imide microfine particles and crosslinked imide microfine particles. The mean particle diameters of those particles and the coefficients of variation were also determined as in Example 1. The results are shown in Tables 1~3.

EXAMPLE 9

Except that PMDA/cis-4-cyclohexene-1,2-dicarboxylic anhydride/acetone=0.001 mol/0.001 mol/50 ml was used as the first solution and p-phenylenediamine/acetone=0.002 mol/50 ml as the second solution, the series of procedures described in Example 1 were repeated to provide thermosetting amic acid microfine particles, thermosetting imide microfine particles and crosslinked imide microfine particles. The mean particle diameters of those particles and the coefficients of variation were also determined as in Example 1. The results are shown in Tables 1~3.

Comparative Example 1

Thermosetting imide microfine particles were prepared by the prior art technology.

Thus, DPE/N-methylpyrrolidone=0.002 mol/50 ml was prepared and while this solution was held at=25° C. and stirred, BTDA/maleic anhydride=0.001 mol/0.001 mol was added portionwise and the mixture was stirred for 24 hours to provide a homogeneous solution. To this solution was added 10 ml of xylene, followed by another hour of stirring. The mixture was then stirred for imidation reaction at a constant temperature between 150° C. and 200° C. with the byproduct water being azeotropically removed. The precipitate formed in the course of time was recovered by filtration, washed with NMP, and dried to provide thermosetting imide particles. One milligram of the recovered thermosetting imide particles were heated for crosslinking at 250° C. for 1 hour to obtain crosslinked imide particles. The mean particle particle diameter and coefficient of variation were determined by the same method as used in Example 1. The results are shown in Tables 1~3.

TABLE 1

Thermosetting amic acid microfine particles

| | Mean diameter (μm) | Coefficient of variation (%) |
|---|---|---|
| Example 1 | 0.56 | 8.3 |
| Example 2 | 0.50 | 7.9 |
| Example 3 | 0.55 | 8.5 |
| Example 4 | 0.59 | 7.4 |
| Example 5 | 0.51 | 8.4 |
| Example 6 | 0.47 | 8.6 |
| Example 7 | 0.53 | 8.0 |
| Example 8 | 0.60 | 7.6 |
| Example 9 | 0.07 | 10.66 |
| Compar. Ex. 1 | 2.7 | 12.2 |

TABLE 2

Thermosetting imide microfine particles

| | Mean diameter (μm) | Coefficient of variation (%) |
|---|---|---|
| Example 1 | 0.52 | 6.7 |
| Example 2 | 0.49 | 7.2 |
| Example 3 | 0.53 | 7.4 |
| Example 4 | 0.55 | 6.2 |
| Example 5 | 0.47 | 6.9 |
| Example 6 | 0.45 | 7.1 |
| Example 7 | 0.50 | 6.0 |
| Example 8 | 0.56 | 5.9 |
| Example 9 | 0.067 | 13.76 |
| Compar. Ex. 1 | 2.7 | 11.9 |

TABLE 3

Crosslinked imide microfine particles

| | Mean diameter (μm) | Coefficient of variation (%) |
|---|---|---|
| Example 1 | 0.51 | 6.5 |
| Example 2 | 0.48 | 7.1 |
| Example 3 | 0.53 | 7.4 |
| Example 4 | 0.55 | 6.1 |
| Example 5 | 0.47 | 6.8 |
| Example 6 | 0.44 | 7.1 |
| Example 7 | 0.50 | 6.0 |
| Example 8 | 0.56 | 5.9 |
| Example 9 | 0.067 | 13.70 |
| Compar. Ex. 1 | 2.7 | 11.9 |

It can be seen from Tables 1~3 that compared with the prior art (Comparative Example 1), the particles obtainable by the technology of the invention are finer and more uniform in diameter (mean particle diameter), indicating that the thermosetting amic acid microfine particles, thermosetting imide microfine particles and crosslinked imide microfine particles of the invention are excellent in monodispersibility.

What is claimed is:

1. A method of producing thermosetting amic acid microfine particles starting with a tetracarboxylic anhydride, a carbon-carbon double bond-containing acid anhydride and a diamine compound to synthesize a thermosetting amic acid, which comprises
   (a) a first step of preparing a first solution containing said tetracarboxylic anhydride and said carbon-carbon double bond-containing acid anhydride and a second solution containing said diamine compound and
   (b) a second step of mixing said first solution with said second solution and precipitating thermosetting amic acid microfine particles from the mixture.

2. A method of producing thermosetting imide microfine particles starting with a tetracarboxylic anhydride, a carbon-carbon double bond-containing acid anhydride and a diamine compound to synthesize a thermosetting imide, which comprises
   (a) a first step of preparing a first solution containing said tetracarboxylic anhydride and said carbon-carbon double bond-containing acid anhydride and a second solution containing said diamine compound,
   (b) a second step of mixing said first solution with said second solution and precipitating thermosetting amic acid microfine particles from the mixture, and
   (c) a third step of imidating the resulting thermosetting amic acid microfine particles to provide thermosetting imide microfine particles.

3. A method of producing crosslinked imide microfine particles starting with a tetracarboxylic anhydride, a carbon-carbon double bond-containing acid anhydride and a diamine compound, which comprises
   (a) a first step of preparing a first solution containing said tetracarboxylic anhydride and carbon-carbon double bond-containing acid anhydride and a second solution containing said diamine compound,
   (b) a second step of mixing said first solution with said second solution and precipitating thermosetting amic acid microfine particles from the mixture,
   (c) a third step of imidating the resulting thermosetting amic acid microfine particles to provide thermosetting imide microfine particles, and
   (d) a fourth step of heat-treating the resulting thermosetting imide microfine particles.

4. The method of producing thermosetting amic acid microfine particles as claimed in claim 1 wherein the procedure of the second step is executed under ultrasonic agitation.

5. The method of producing thermosetting imide microfine particles as claimed in claim 2 wherein the procedure of the second step is executed under ultrasonic agitation.

6. The method of producing crosslinked imide microfine particles as claimed in claim 3 wherein the procedure of the second step is executed under ultrasonic agitation.

7. The method of producing thermosetting amic acid microfine particles as claimed in claim 1 wherein the solvent of said first solution contains at least one member selected from the group consisting of 2-propanone, 3-pentanone, tetrahydropyrene, epichlorohydrin, acetone, methyl ethyl ketone, acetophenone, tetrahydrofuran, dioxane, methyl acetate and ethyl acetate.

8. The method of producing thermosetting imide microfine particles as claimed in claim 2 wherein the solvent of said first solution contains at least one member selected from the group consisting of 2-propanone, 3-pentanone, tetrahydropyrene, epichlorohydrin, acetone, methyl ethyl ketone, acetophenone, tetrahydrofuran, dioxane, methyl acetate and ethyl acetate.

9. The method of producing crosslinked imide microfine particles as claimed in claim 3 wherein the solvent of said first solution contains at least one member selected from the group consisting of 2-propanone, 3-pentanone, tetrahydropyrene, epichlorohydrin, acetone, methyl ethyl ketone, acetophenone, tetrahydrofuran, dioxane, methyl acetate and ethyl acetate.

10. The method of producing thermosetting amic acid microfine particles as claimed in claim 1 wherein the solvent of said second solution contains at least one member selected from the group consisting of 2-propanone, 3-pentanone, tetrahydropyrene, epichlorohydrin, acetone, methyl ethyl ketone, acetophenone, tetrahydrofuran, dioxane, methyl acetate and ethyl acetate.

11. The method of producing thermosetting imide microfine particles as claimed in claim 2 wherein the solvent of said second solution contains at least one member selected from the group consisting of 2-propanone, 3-pentanone, tetrahydropyrene, epichlorohydrin, acetone, methyl ethyl ketone, acetophenone, tetrahydrofuran, dioxane, methyl acetate and ethyl acetate.

12. The method of producing crosslinked imide microfine particles as claimed in claim 3 wherein the solvent of said second solution contains at least one member selected from the group consisting of 2-propanone, 3-pentanone, tetrahydropyrene, epichlorohydrin, acetone, methyl ethyl ketone, acetophenone, tetrahydrofuran, dioxane, methyl acetate and ethyl acetate.

13. The method of producing thermosetting imide microfine particles as claimed in claim 2 wherein the third step comprises imidating thermosetting amic acid microfine particles in an organic solvent.

14. The method of producing thermosetting imide microfine particles as claimed in claim 2 wherein the third step comprises heating thermosetting amic acid microfine particles in solvent containing an organic solvent to form an azeotropic mixture with water for imidation with the byproduct water being azeotropically removed from the reaction system.

15. The method of producing thermosetting imide microfine particles as claimed in claim 2 wherein the imidation in the third step copmprises heating thermosetting amic acid microfine particles in a solvent system containing an organic solvent to form an azeotropic mixture with water and an acid catalyst with the byproduct water being azeotropically removed from the reaction system.

16. The method of producing thermosetting imide microfine particles as claimed in claim 2 wherein the third step comprises imidating thermosetting amic acid microfine particles in the presence of a dehydrating agent.

17. The method of producing thermosetting imide microfine particles as claimed in claim 2 wherein the third step comprises imidating thermosetting amic acid microfine particles in the presence of a dehydrating agent and a dehydration catalyst.

18. A thermosetting amic acid microfine powder as produced by the method claimed in claim 1 which has a mean particle diameter of 0.03~1 $\mu$m with a coefficient of variation within the range of 3~15%.

19. A thermosetting imide microfine powder as produced by the method claimed in claim 2 which has a mean particle diameter of 0.03~1 $\mu$m with a coefficient of variation within the range of 3~15%.

20. A crosslinked imide microfine powder as produced by the method claimed in claim 3 which has a mean particle diameter of 0.03~1 $\mu$m with a coefficient of variation within the range of 3~15%.

* * * * *

UNITED STATES PATENT AND TRADEMARK OFFICE
CERTIFICATE OF CORRECTION

PATENT NO.    : 6,333,392 B1                                          Page 1 of 1
DATED         : December 25, 2001
INVENTOR(S)   : Asao, Katsuya et al.

It is certified that error appears in the above-identified patent and that said Letters Patent is hereby corrected as shown below:

<u>Title page,</u>
Item [73], Assignee, should read as follows:

-- [73]   Assignees:   Sumitomo Bakelite Company Limited, Tokyo; Osaka Prefectural Government, Osaka-fu, both of (JP) --

Signed and Sealed this

Second Day of September, 2003

JAMES E. ROGAN
*Director of the United States Patent and Trademark Office*